(12) United States Patent
Yamane

(10) Patent No.: US 10,190,485 B2
(45) Date of Patent: Jan. 29, 2019

(54) CONTROL APPARATUS FOR ENGINE

(71) Applicant: TOYOTA JIDOSHA KABUSHIKI KAISHA, Toyota-shi, Aichi-ken (JP)

(72) Inventor: Naruto Yamane, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 65 days.

(21) Appl. No.: 15/316,271

(22) PCT Filed: May 15, 2015

(86) PCT No.: PCT/JP2015/064836
§ 371 (c)(1),
(2) Date: Dec. 5, 2016

(87) PCT Pub. No.: WO2015/186543
PCT Pub. Date: Dec. 10, 2015

(65) Prior Publication Data
US 2017/0145905 A1 May 25, 2017

(30) Foreign Application Priority Data

Jun. 6, 2014 (JP) .................................. 2014-117896

(51) Int. Cl.
*F02M 26/05* (2016.01)
*F02B 37/14* (2006.01)
(Continued)

(52) U.S. Cl.
CPC .............. *F02B 37/14* (2013.01); *F02B 37/04* (2013.01); *F02B 37/18* (2013.01); *F02B 37/24* (2013.01);
(Continued)

(58) Field of Classification Search
CPC .......... F02B 37/14; F02B 37/04; F02B 39/10; F02B 29/04; F02B 39/04; F02B 29/0418;
(Continued)

(56) References Cited

U.S. PATENT DOCUMENTS 9,902,282 B2 * 2/2018 Akashi ................ B60L 11/1851
2001/0054287 A1 12/2001 Hoecker et al.
(Continued)

FOREIGN PATENT DOCUMENTS

| CN | 102822480 A | 12/2012 |
|---|---|---|
| DE | 10 2010 007 601 A1 | 8/2011 |
| EP | 1 749 990 A2 | 2/2007 |
| JP | 04330332 A * | 11/1992 |
| JP | 2002-021573 A | 1/2002 |
| WO | 03/060298 A1 | 7/2003 |

OTHER PUBLICATIONS

International Search Report of PCT/JP2015/064836, dated Aug. 19, 2015. [PCT/ISA/210].

*Primary Examiner* — Jason Newton
(74) *Attorney, Agent, or Firm* — Sughrue Mion, PLLC

(57) ABSTRACT

A control apparatus for an engine is configured to control the engine provided with: an exhaust-driven supercharger, provided with an adjusting mechanism which can change supercharging efficiency according to an opening degree, in an exhaust passage, and having a first control mode and a second control mode as a control mode of the adjusting mechanism, the first control mode allowing the opening degree to be maintained at a maximum supercharging efficiency opening degree at which the exhaust-driven supercharger has maximum supercharging efficiency without using a deviation between a target supercharging pressure and an actual supercharging pressure, the second control mode allowing the deviation to be fed back to the opening degree; and an electrically-driven supercharger driven by electric power supplied from a power supply. The control apparatus is provided with: a determining device configured to determine whether or not an electrified amount of the
(Continued)

electrically-driven supercharger decreases; and a maintaining device configured to maintain the control mode in the first control mode before it is determined that the electrified amount decreases.

4 Claims, 11 Drawing Sheets

(51) Int. Cl.
    *F02B 37/04*         (2006.01)
    *F02B 37/18*         (2006.01)
    *F02B 37/24*         (2006.01)
    *F02B 39/10*         (2006.01)
    *F02D 41/00*         (2006.01)
    *F02B 29/04*         (2006.01)
    *F02M 26/23*        (2016.01)

(52) U.S. Cl.
    CPC .......... F02B 39/10 (2013.01); F02D 41/0007 (2013.01); *F02B 29/0406* (2013.01); *F02D 2200/0406* (2013.01); *F02M 26/05* (2016.02); *F02M 26/23* (2016.02); *Y02T 10/144* (2013.01)

(58) Field of Classification Search
    CPC ...... F02B 29/0412; F02B 37/16; F02B 37/24; F02D 41/0007; F02D 23/00; F02D 29/06; F02D 2200/0402; F02D 2200/0414; F02D 2200/04
    USPC .......................................................... 60/608
    See application file for complete search history.

(56) References Cited

U.S. PATENT DOCUMENTS

| | | | |
|---|---|---|---|
| 2003/0140630 A1* | 7/2003 | Baeuerle | F02B 33/32 60/612 |
| 2003/0192313 A1 | 10/2003 | Hoecker et al. | |
| 2005/0022525 A1* | 2/2005 | Ellmer | F02B 37/04 60/609 |
| 2007/0033938 A1* | 2/2007 | Ueno | F02B 37/004 60/612 |
| 2008/0041323 A1* | 2/2008 | Clark | F02B 33/40 123/3 |
| 2008/0053091 A1* | 3/2008 | Barthelet | F02B 37/10 60/608 |
| 2009/0000298 A1* | 1/2009 | Barthelet | F02B 37/04 60/608 |
| 2010/0089056 A1* | 4/2010 | Cooper | F01D 15/10 60/605.1 |
| 2011/0174278 A1* | 7/2011 | Watanabe | B60W 10/06 123/565 |
| 2013/0008161 A1* | 1/2013 | Flohr | F02B 37/001 60/600 |
| 2014/0346865 A1* | 11/2014 | Akashi | B60L 11/1851 307/10.7 |
| 2017/0002726 A1* | 1/2017 | Iwamoto | F01D 15/10 |
| 2017/0044971 A1* | 2/2017 | Racca | F02B 37/14 |
| 2017/0130658 A1* | 5/2017 | Makkapati | F02B 33/44 |
| 2017/0130664 A1* | 5/2017 | Rueger | F02B 39/10 |
| 2017/0133963 A1* | 5/2017 | Uetsuji | H02P 6/20 |
| 2017/0145905 A1* | 5/2017 | Yamane | F02B 37/14 |
| 2017/0152800 A1* | 6/2017 | Han | F02B 37/16 |
| 2017/0268415 A1* | 9/2017 | Kobayashi | F02D 29/06 |
| 2017/0328271 A1* | 11/2017 | Yamashita | F02B 37/24 |
| 2017/0328272 A1* | 11/2017 | Yamashita | F02B 39/10 |
| 2018/0016971 A1* | 1/2018 | Yamashita | H02P 27/06 |

* cited by examiner

CONTROL APPARATUS FOR ENGINE

CROSS REFERENCE TO RELATED APPLICATIONS

This application is a National Stage of International Application No. PCT/JP2015/064836 filed May. 15, 2015, claiming priority based on Japanese Patent Application No. 2014-117896, filed Jun. 6, 2014, the contents of all of which are incorporated herein by reference in their entirety.

TECHNICAL FIELD

The present invention relates to a control apparatus for an engine, wherein the control apparatus is configured to control the engine which is provided with both an exhaust-driven supercharger having a supercharging pressure adjusting function and an electrically-driven supercharger.

BACKGROUND ART

There is known an engine which is provided with an exhaust-driven supercharger such as a turbocharger or the like and an electrically-driven supercharger (for example, refer to a Patent literature 1). There is also known an exhaust-driven supercharger having some type of an adjusting mechanism such as, for example, a variable nozzle (VN: Variable Nozzle Mechanism) and a waste gate valve (WGV) which is configured to be capable of changing a supercharging efficiency according to an opening/closing state thereof.

CITATION LIST

Patent Literature

Patent Literature 1: Japanese Patent Application Laid Open No. 2002-021573

SUMMARY OF INVENTION

Technical Problem

This type of adjusting mechanism is controlled to be in an opening/closing state which is set such that the exhaust-driven supercharger has a maximum supercharging efficiency in advance, in a period in which there is a large deviation between a target supercharging pressure and an actual supercharging pressure (hereinafter, this deviation is referred to as a "supercharging pressure deviation", such as, for example, at the beginning of the supercharging. Thus, a supercharging responsiveness is improved. Moreover, when the supercharging pressure deviation becomes smaller along with an increasing of the actual supercharging pressure, an aspect of controlling the opening/closing state is changed from a control which does not reflect this type of supercharging pressure deviation to a feedback control which reflects the supercharging pressure deviation (hereinafter, the feedback control is expressed as a "FIB control"). Thus, an overshoot of the supercharging pressure is prevented.

Here, conventionally, a requirement for controlling the adjusting mechanism in the exhaust-driven supercharger is independent of a requirement of a controlling a supply of an electrical power to the electrically-driven supercharger. Thus, the aspect of controlling the adjusting mechanism can be changed to the aforementioned F/B control in a period during which the electrically-driven supercharger operates.

By the way, the F/B control of the opening/closing state places emphasis on maintaining (keeping) the actual supercharging pressure at the target supercharging pressure. The supercharging efficiency is thus not always high. Therefore, if the electrically-driven supercharger stops operating in this state, the supercharging pressure sometimes decreases temporally. Consequently, in this case, it is necessary to continue the operation of the electrically-driven supercharger even though the exhaust-driven supercharger still has a sufficient supercharging capacity. This results in a waste of an electrical power consumption in the electrically-driven supercharger. In other words, the conventional technology has such a technical problem that it is hard to suppress the waste of the electrical power consumption in the engine which is provided with both the exhaust-driven supercharger and the electrically-driven supercharger.

It is therefore an object of the present invention to provide a control apparatus for an engine, wherein the control apparatus is configured to suppress the waste of the electrical power consumption in the electrically-driven supercharger and the engine is provided with both the exhaust-driven supercharger and the electrically-driven supercharger.

Solution to Problem

The above object of the present invention can be achieved by a first aspect of a control apparatus for an engine of the present invention. The first aspect of a control apparatus for an engine of the present invention is configured to control the engine, the engine is provided with: an exhaust-driven supercharger having an adjusting mechanism at an exhaust passage, the adjusting mechanism is configured to change a supercharging efficiency according to an opening degree, control modes of the adjusting mechanism includes a first control mode and a second control mode, the first control mode allows the opening degree to be maintained at a maximum supercharging efficiency opening degree at which the exhaust-driven supercharger has a maximum supercharging efficiency independently of a deviation between a target supercharging pressure and an actual supercharging pressure, the second control mode allows the deviation to be fed back to the opening degree; and an electrically-driven supercharger which is driven by an electrical power supplied from an electrical power supply, the control apparatus is provided with: a determining device which is configured to determine whether or not a supplied amount of the electrical power to the electrically-driven supercharger decreases; and a maintaining device which is configured to maintain the control mode in the first control mode before it is determined that the supplied amount decreases.

The adjusting mechanism which is provided for the exhaust-driven supercharger is a mechanism which is capable of changing the supercharging efficiency according to the opening degree (i.e. the extent of opening/closing) which quantitatively defines the opening/closing state of a valve or a nozzle. The adjusting mechanism includes, for example, a variable nozzle (VN: Variable Nozzle Mechanism), a waste gate valve (WGV) and the like. The control modes for controlling the opening degree of the adjusting mechanism include at least the first control mode and the second control mode.

In the first control mode, the opening degree of the adjusting mechanism is maintained at the maximum supercharging efficiency opening degree at which the exhaust-driven supercharger has the maximum supercharging efficiency. The maximum supercharging efficiency opening degree varies depending on operating conditions of the engine. The maximum supercharging efficiency opening degree is shifted to an increase side (i.e. a valve opening side) along with an increasing of an intake air amount, for example. The maximum supercharging efficiency opening degree increases as the intake air amount increases, for example. The maximum supercharging efficiency opening degree does not depend on the deviation between the target supercharging pressure and the actual supercharging pressure (hereinafter, this deviation is referred to as the "supercharging pressure deviation" as occasion demands). Namely, in the first control mode, the supercharging pressure deviation is not used for determining the opening degree of the adjusting mechanism. The "actual supercharging pressure" which defines the supercharging pressure deviation means a pressure of an intake passage on a downstream side of the exhaust-driven supercharger and the electrically-driven supercharger. A pressure of an intake manifold or the like can be used as the actual supercharging pressure, for example. In other words, the actual supercharging pressure does not mean an individual supercharging pressure of the exhaust-driven supercharger or the electrically-driven supercharger.

The maximum supercharging efficiency opening degree is not necessarily an opening degree at which the supercharging efficiency is strictly maximal. The maximum supercharging efficiency opening degree can be determined, experimentally, experientially or theoretically, in advance. The maximum supercharging efficiency opening degree is preferably stored in association with the operating conditions of the engine (for example, the intake air amount or a number of engine revolutions and a fuel injection amount, and so on) in advance.

In the second control mode, the supercharging pressure deviation is used to determine the opening degree of the adjusting mechanism, from the viewpoint of preventing the overshoot of the actual supercharging pressure. Namely, the supercharging pressure deviation is fed back (hereinafter, the feedback is expressed as a "F/B" as occasion demands) to determine the opening degree of the adjusting mechanism. The opening degree of the adjusting mechanism is corrected to a relatively close valve side on which the supercharging efficiency increases when the supercharging pressure deviation increases. The opening degree of the adjusting mechanism is corrected to a relatively open valve side on which the supercharging efficiency decreases when the supercharging pressure deviation decreases. The second control mode is a control mode which aims principally at maintaining the actual supercharging pressure at the target supercharging pressure while preventing the overshoot of the actual supercharging pressure. The supercharging efficiency is therefore lower than the maximum value which is realized by the maximum supercharging efficiency opening degree. Namely, in the second control mode, the exhaust-driven supercharger does not use up all of its supercharging capacity but has a sufficient capacity left.

Here, according to the first aspect of the control apparatus for the engine, the control mode of the adjusting mechanism is maintained in the first control mode during a period during which both of the exhaust-driven supercharger and the electrically-driven supercharger operate, until it is determined that the supplied amount of the electrical power to the electrically-driven supercharger decreases. Namely, the supercharging efficiency of the exhaust-driven supercharger is always maintained at the maximum during the period during which the electrically-driven supercharger operates. In other words, the supercharging by the electrically-driven supercharger and the supercharging according to the second control mode of the electrically-driven supercharger do not overlap in time series.

Therefore, according to the first aspect of the control apparatus for the engine, the electrically-driven supercharger does not continue to wastefully operate in the situation where the exhaust-driven supercharger has the sufficient supercharging capacity. In other words, it is possible to suppress the waste of the electrical power consumption of the electrically-driven supercharger in the engine which is provided with both of the exhaust-driven supercharger and the electrically-driven supercharger.

The maintaining device may forbid the usage of the second control mode until it is determined that the supplied amount of the electrical power to the electrically-driven supercharger decreases. The maintaining device may forbid the usage of the second control mode while maintain the first control mode.

In another aspect of the first aspect of the control apparatus for the engine of the present invention, the determining device determines whether or not the supply of the electrical power to the electrically-driven supercharger stops.

According to this aspect, the maintaining device is capable of certainly maintaining the first control mode until the supply of the electrical power to the electrically-driven supercharger stops.

In another aspect of the first aspect of the control apparatus for the engine of the present invention, the control apparatus is further provided with a stopping device which is configured to stop the supply of the electrical power to the electrically-driven supercharger, when the deviation reaches a first reference value or a time during which the electrical power is supplied to the electrically-driven supercharger reaches a predetermined time during a period during which the actual supercharging pressure increases.

According to this aspect, the stopping device is capable of stopping the supply of the electrical power to the electrically-driven supercharger on the basis of the supercharging pressure deviation or the time during which the electrical power is supplied (namely, in accordance with either one of the conditions that is satisfied earlier). Thus, the electrically-driven supercharger can be efficiently used. Moreover, whichever condition is satisfied, the control mode of the adjusting mechanism is maintained in the first control mode until it is determined that the supplied amount of the electrical power decreases due to the stop of the supply of the electrical power to the electrically-driven supercharger. Therefore, it is possible to suppress the waste of the electrical power consumption of the electrically-driven supercharger.

The above object of the present invention can be achieved by a second aspect of a control apparatus for an engine of the present invention. The second aspect of a control apparatus for an engine of the present invention is configured to control the engine, the engine is provided with: an exhaust-driven supercharger having an adjusting mechanism at an exhaust passage, the adjusting mechanism being configured to change a supercharging efficiency according to an opening degree; and an electrically-driven supercharger which is driven by an electrical power supplied from an electrical power supply, control modes of the adjusting mechanism includes a first control mode and a second control mode, the first control mode allows the opening degree to be maintained at a maximum supercharging efficiency opening degree at which the exhaust-driven supercharger has a maximum supercharging efficiency independently of a deviation between a target supercharging pressure and an actual supercharging pressure, the second control mode allows the deviation to be fed back to the opening degree, the control apparatus is provided with: a stopping device which is configured to stop the supply of the electrical power to the electrically-driven supercharger, when the deviation reaches a first reference value during a period during which the actual supercharging pressure increases; and a maintaining device which is configured to maintain the control mode in the first control mode when the deviation is greater than or equal to a second reference value, the first reference value is equal to or greater than the second reference value.

According to the second aspect of the control apparatus for the engine, the electrically-driven supercharger stops operating when the supercharging pressure deviation reaches the first reference value. More specifically, a control for decreasing the supplied amount of the electrical power toward a stop of the operation (the supplied amount of the electrical power becomes zero) starts.

On the other hand, the control mode of the adjusting mechanism is maintained in the first control mode during a period during which the supercharging pressure deviation is greater than or equal to the second reference value. Here, the second reference value is a value which is less than or equal to the first reference value and which is reached by the actual supercharging pressure after reaching the first reference value. Namely, from the viewpoint of the supercharging pressure deviation, the supplied amount of the electrical power to the electrically-driven supercharger always starts to decrease before the adjusting mechanism is changed to the second control mode. In other words, the supercharging efficiency of the exhaust-driven supercharger is always maintained at the maximum during the period during which the electrically-driven supercharger operates.

Therefore, according to the second aspect of the control apparatus for the engine, the electrically-driven supercharger does not continue to wastefully operate in the situation where the exhaust-driven supercharger has the sufficient supercharging capacity. In other words, it is possible to suppress the waste of the electrical power consumption of the electrically-driven supercharge in the engine which is provided with both of the exhaust-driven supercharger and the electrically-driven supercharger.

Since the first reference value is greater than or equal to the second reference value, the first reference value may be equal to the second reference value. Even in this case, the control mode of the adjusting mechanism is not changed to the second control mode during the period during which the electrically-driven supercharger operates, because the supply of the electrical power to the electrically-driven supercharger is firstly stopped.

The operation and other advantages of the present invention will become more apparent from embodiments explained below.

DESCRIPTION OF EMBODIMENTS

<Embodiments of the Invention>

Hereinafter, preferable embodiments of the present invention will be explained with reference to the drawings.

<First Embodiment>

<Structure of Embodiment>

Figure 1:
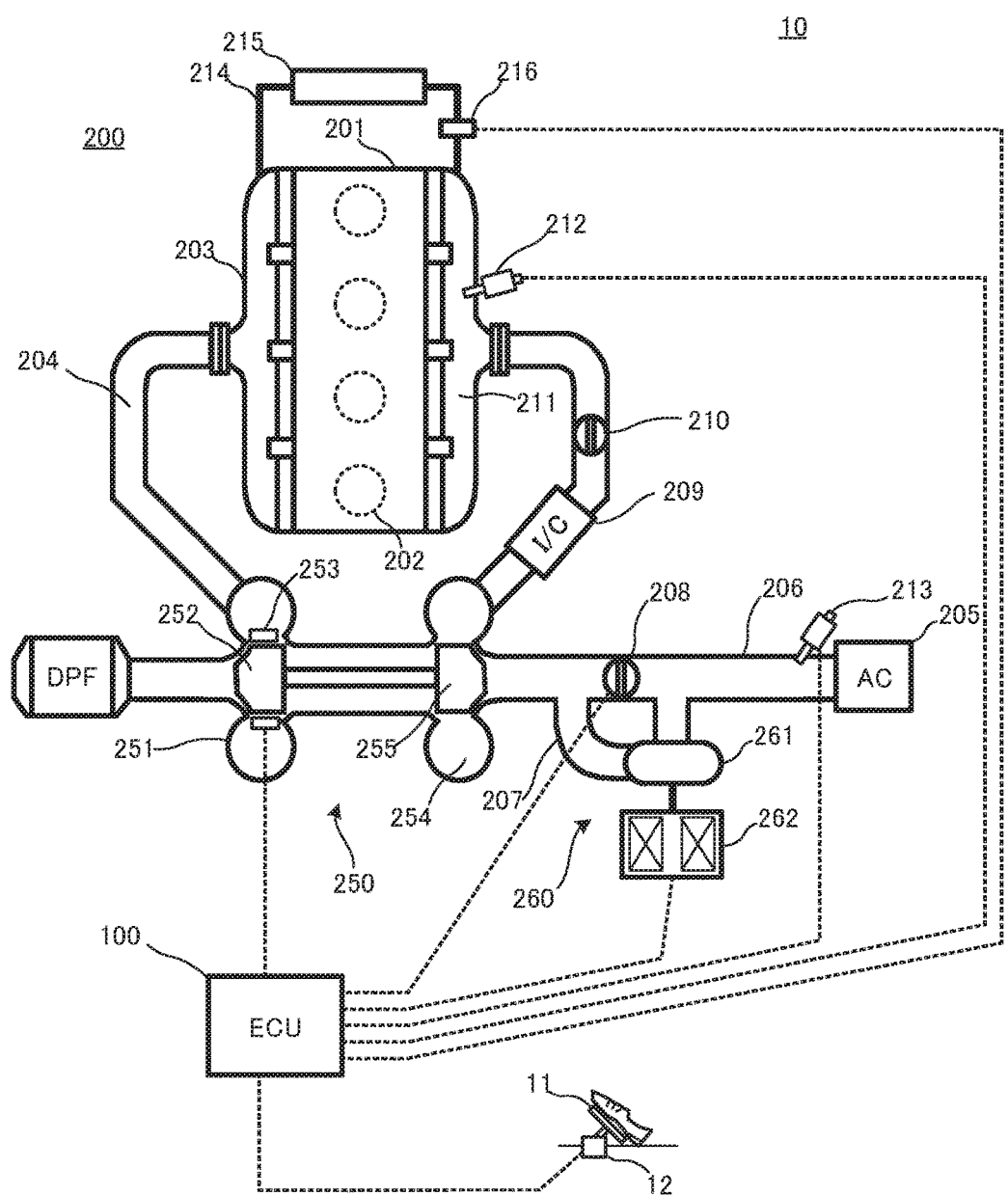
FIG. 1 is a schematic block diagram conceptually illustrating a structure of an engine system in a first embodiment of the present invention.

Firstly with reference to FIG. 1, a structure of an engine system 10 in a first embodiment of the present invention will be explained. FIG. 1 is a schematic block diagram conceptually illustrating the structure of the engine system 10.

In FIG. 1, the engine system 10 is provided with an ECU (Electro Control Unit) 100 and an engine 200.

The ECU 100 is a computer apparatus including a central processing unit (CPU), a read only memory (ROM), a random access memory (RAM) and the like. The ECU 100 functions as one example of the above described "control apparatus for the engine". In the embodiment, the ECU 100 is configured as one computer apparatus. However, the above described "control apparatus for the engine" may be provided with a plurality of computer apparatuses. The above described "control apparatus for the engine" may be provided with a plurality of controllers. The ECU 100 is configured to perform various control processes which is associated with operation control of the engine 200 in accordance with a control program which is stored in the ROM. A supercharging control among the various control processes will be described later.

The engine 200 is a multi-cylinder diesel engine which is one example of the above described "engine". Now, a basic structure of the engine 200 will be explained with a part of the operation thereof.

In the engine 200, four cylinders 202 are accommodated in a cylinder block including a cylinder head 201. A light oil which is a fuel is directly injected to the inside of the cylinders via a known high-pressure fuel injection apparatus such as a not-illustrated common rail, for example. Then, the light oil is mixed with the air at an intake stroke. A fuel-air mixture including the air and the fuel spontaneously ignites at the vicinity of an end of a compression stroke and burns in a combustion chamber. A combustion energy which is caused by the combustion is converted into a motion energy by driving a not-illustrated crankshaft via a not-illustrated piston and a not-illustrated connecting rod. The rotation of the crankshaft is detected by a not-illustrated crank angle sensor. The crank angle sensor is electrically connected to the ECU 100. The ECU 100 is configured to calculate a number of engine revolutions Ne by performing a time processing on the detected rotation of the crankshaft. Moreover, an exhaust gas, which is generated by the combustion is emitted from each cylinder at an exhaust stroke, is collected to an exhaust manifold 203, and then is led to an exhaust tube 204 which is connected to the exhaust manifold 203. A diesel particulate filter (DPF) (whose reference numeral is omitted) is placed in the exhaust tube 204. The exhaust gas which is led to the exhaust tube 204 is purified by the DPF. The engine of the present embodiment is the diesel engine. However, the engine may be a gasoline engine or the like, for example.

The engine 200 is provided with a VN turbocharger 250. The VN turbocharger 250 is one example of the above described "exhaust-driven supercharger", in which a turbine blade 252 which is accommodated in a turbine housing 251 and a compressor impeller 255 which is accommodated in a compressor housing 254 are connected by a turbo rotating shaft (whose reference numeral is omitted). The VN turbocharger 250 is capable of collecting an exhaust heat of the exhaust gas which is led to the exhaust tube 204 to rotationally drive the turbine blade 252, and is capable of using a fluid compression action of the compressor impeller 255 which substantially integrally rotates with the turbine blade 252 to supercharge the intake air such that the pressure of the intake air is equal to or more than an atmosphere pressure.

The VN turbocharger 250 is provided with a variable nozzle (VN) 253. The VN 253 is a variable nozzle mechanism having a plurality of nozzles which are placed in a circular pattern at the surroundings of the turbine blade 252 in the turbine housing 251. A not-illustrated VN actuator allows the nozzles to be capable of rotationally moving in the turbine housing 251. A change of an opening/closing state of the VN 253 which is caused by the rotational movement of the nozzles changes a size of a coupling area at which a pipe on the turbine blade 252 side and a pipe on the exhaust manifold 203 side is coupled with each other, wherein the nozzles are between the turbine blade 252 and the exhaust manifold 203. As a result, an amount of flow and a flow rate of the exhaust gas which is supplied to the turbine blade 252 changes depending on the opening/closing state of the nozzles. Therefore, the VN 253 is capable of changing the supercharging efficiency of the VN turbocharger 250 depending on the extent of the opening/closing state (namely, an opening degree). In other words, the VN 253 is one example of the above described "adjusting mechanism". A VN opening degree Avn which is the opening degree of the VN 253 is detected by a not-illustrated opening sensor. The VN opening degree Avn is variably controlled in a range between a fully-closed opening degree (Avn=0(%)) by which the above described coupling area becomes a minimum to a fully-opened opening degree (Avn=100(%)) by which the above described coupling area becomes a maximum.

In the engine 200, the air is sucked into an intake tube 206 from the exterior via an air cleaner 205. The intake air is compressed by the rotation of the compressor impeller 255 of the VN turbocharger 250. An intercooler 209 is placed on the downstream side of the compressor housing 254 in the intake tube 206. The intercooler 209 is a cooling apparatus for cooling the compressed intake air to improve the supercharging efficiency.

A throttle valve 210 is placed on the downstream side of the intercooler 209 in the intake tube 206. The throttle valve 210 is an electronically controlled valve which is configured to adjust an amount of the intake air depending on an opening/closing state thereof. The opening/closing state of the throttle valve 210 is controlled by a not-illustrated actuator which is electrically connected to the ECU 100. Since the engine 200 is a diesel engine, the throttle valve 210 is basically maintained in the fully-opened state.

The intake tube 206 is connected to an intake manifold 211 on the downstream side of the throttle valve 210. The intake manifold 211 is connected to intake ports which correspond to the respective cylinders and which are formed in the cylinder head 201. The intake air which is led to the intake manifold 211 is sucked into each cylinder 202 via the intake port when a not-illustrated intake valve in each cylinder 202 is opened.

Moreover, an intake manifold pressure sensor 212 is placed in the intake manifold 211. The intake manifold pressure sensor 212 is configured to detect an intake manifold pressure Pim which represents an inner pressure of the intake manifold 211. The intake manifold pressure sensor 212 is electrically connected to the ECU 100. The detected intake manifold pressure Pim is referred to by the ECU 100 as occasion demands. The intake manifold pressure Pim is used as a supercharging pressure which is caused by a cooperative supercharging of the VN turbocharger 250 and a below described electrical compressor 260. The intake manifold pressure Pim is one example of the above described "actual supercharging pressure".

An airflow sensor 213 is placed in the intake tube 206. The airflow sensor 213 is a sensor which is configured to detect an intake air amount Ga which represents the amount of the intake air sucked from the exterior. The airflow sensor 213 is electrically connected to the ECU 100. The detected intake air amount Ga is referred to by the ECU 100 as occasion demands.

Moreover, the exhaust manifold 203 and the intake manifold 211 are connected by an EGR passage 214. An EGR cooler 215 and an EGR valve 216 are placed in the EGR passage 214. The EGR cooler 215 and the EGR valve 216 constitute a high pressure loop (HPL) EGR apparatus. The operation of the EGR valve 216 is controlled by the ECU 100. Since the HPLEGR apparatus has less relation to the present invention, the detail of the HPL apparatus is omitted.

The intake tube 206 branches to a bypass tube 207 on the upstream side of the compressor housing 254 of the VN turbocharger 250. A compressor 261 is placed in the bypass tube 207. The compressor 261 is an electrically-driven compressor which is driven by a motor 262 and which compresses a fluid by the rotation of the compressor 261. The compressor 261 and the motor 262 constitute the electrical compressor 260 which is one example of the above described "electrically-driven supercharger". The motor 262 operates by using an electrical power of a not-illustrated battery which is supplied via a not-illustrated inverter. The ECU 100 controls the operation of the motor 262 (i.e. the operation of the compressor 261) by using the inverter.

A bypass adjusting valve 208 is placed in a bypassed section in the bypass tube 207. The bypass adjusting valve 208 is a valve apparatus which is configured to adjust a flow ratio, which represents a ratio of a flow amount in the intake tube 206 and a flow amount in the bypass tube 207, depending on an opening degree of the bypass adjusting valve 208. The bypass adjusting valve 208 is electrically connected to the ECU 100. The opening degree of the bypass adjusting valve 208 is adjusted by the ECU 100.

Moreover, the ECU 100 is electrically connected to an accelerator opening sensor 12 which is configured to detect an accelerator opening degree accp which represents a manipulated amount of an accelerator pedal 11 operated by a drier. Therefore, the ECU 100 is capable of referring to the detected accelerator opening degree accp as occasion demands.

<Operation of Embodiment>

Next, the operation of the embodiment will be explained.

<Basic Operation of VN Turbocharger 250>

Figure 2:
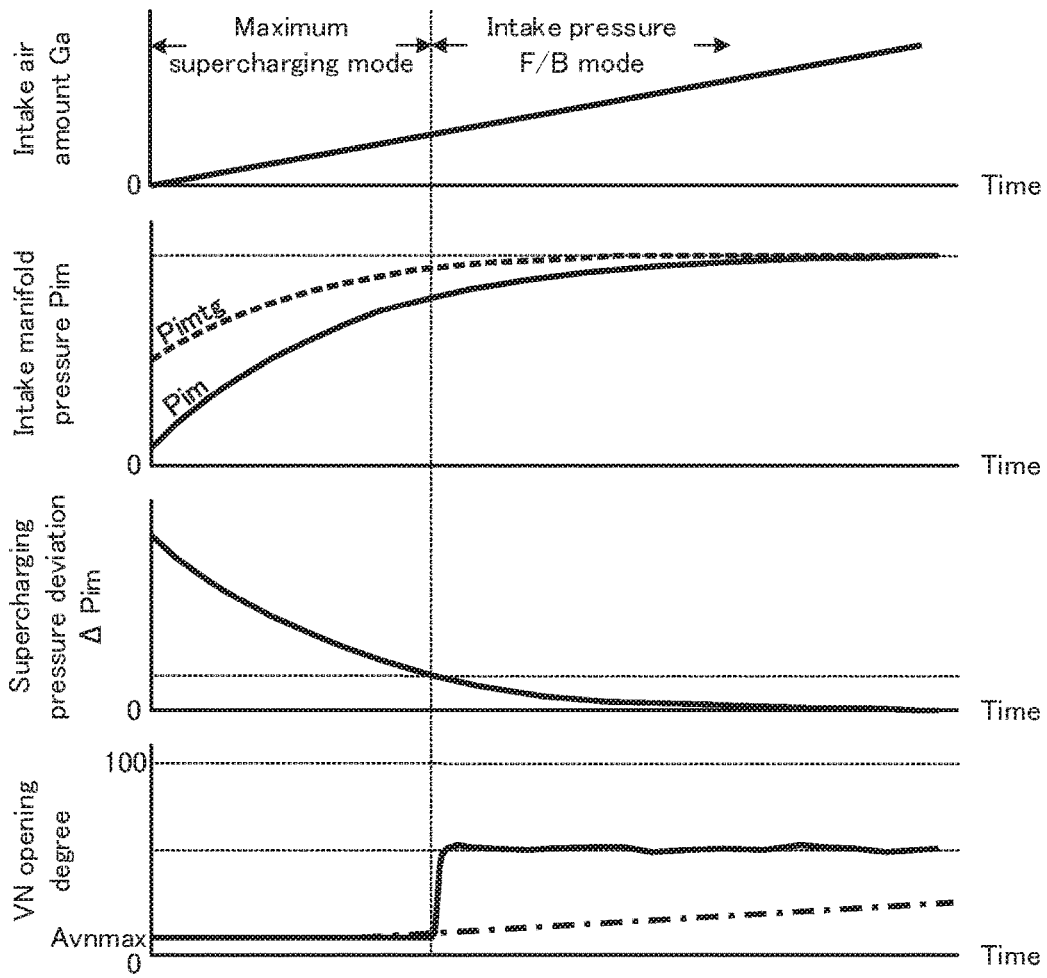
FIG. 2 is a timing chart explaining conventional operational control of a VN turbocharger.

Firstly, with reference to FIG. 2, a conventional operational control of the VN turbocharger 250 will be explained. FIG. 2 is a timing chart explaining the conventional operational control of the VN turbocharger 250. The conventional operational control means the operational control of the VN turbocharger 250 in an engine system having only the VN turbocharger 250 as a supercharger.

FIG. 2 illustrates a time transition of the intake air amount Ga, a time transition of the intake manifold pressure Pim, a time transition of a supercharging pressure deviation ΔPim, and a time transition of the VN opening degree Avn in this order from its top.

As a control mode which is associated with an opening degree control of the VN 253 in the VN turbocharger 250, there are prepared two types of control modes which are a maximum supercharging mode and an intake pressure F/B mode. The maximum supercharging mode is one example of the above described "first control mode", and the intake pressure F/B mode is one example of the above described "second control mode".

In the maximum supercharging mode, the VN opening degree Avn is maintained at a maximum supercharging efficiency opening degree Avnmax without using the supercharging pressure deviation ΔPim. The maximum supercharging efficiency opening degree Avnmax is an opening degree which is suitably set by experiments or the like in advance and by which the supercharging efficiency of the VN turbocharger 250 is maximum. In FIG. 2, the maximum supercharging efficiency opening degree Avnmax is expressed by an alternate long and short dash line (one portion of the line overlaps a solid line which represents a transition in the actual VN opening degree).

Figure 3:
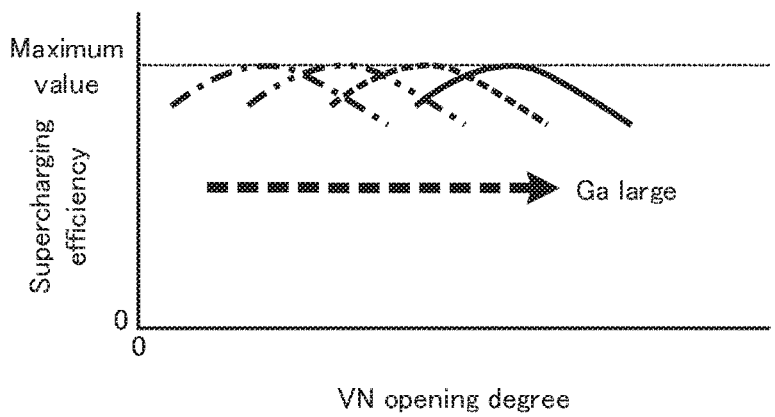
FIG. 3 is a conceptual diagram illustrating maximum supercharging efficiency opening degree of the VN turbocharger.

Now, with reference to FIG. 3, the maximum supercharging efficiency opening degree Avnmax will be explained. FIG. 3 is a conceptual diagram illustrating the maximum supercharging efficiency opening degree Avnmax.

In FIG. 3, the maximum supercharging efficiency opening degree Avnmax is a local maximum value of a characteristic line of the supercharging efficiency to the VN opening degree Avn. In FIG. 3, one portion of the characteristic line is expressed by an alternate long and short dash line, a two dot chain line, a dashed line and a solid line along a direction of increasing the intake air amount Ga. As illustrated in FIG. 3, the maximum supercharging efficiency opening degree Avnmax is basically on a valve closing side, and is gradually shifted to a valve opening side as the intake air amount Ga increases. This is because a higher exhaust flow rate allows the supercharging efficiency to improve on a small intake air amount side in which the amount of the exhaust gas supplied to the turbine blade 252 is not sufficient, and because an excessive closing of the VN 253 increases a back pressure of the engine 200 on a large intake air amount side in which the amount of the exhaust gas supplied to the turbine blade 252 can be ensured.

On the other hand, in the intake pressure F/B mode, the VN opening degree Avn is determined by a PID control (i.e. F/B control) which uses the supercharging pressure deviation ΔPim. The intake pressure F/B mode is executed in order to makes the intake manifold pressure Pim effectively reach a target supercharging pressure Pimtg on the premise that the supercharging efficiency is ensured. Namely, the intake pressure F/B mode is executed in order to prevent the overshoot of the intake manifold pressure Pim (i.e. an actual supercharging pressure). Therefore, the supercharging efficiency in the F/B mode is lower than that in the maximum supercharging mode.

The control mode is changed on the basis of the supercharging pressure deviation ΔPim. The supercharging pressure deviation ΔPim is a deviation of the actual supercharging pressure Pim (refer to a solid line) to the target supercharging pressure Pimtg (refer to a dashed line). An appropriate value is selected, as the target supercharging pressure Pimtg, from a control map which is stored in the ROM on the basis of the number of engine revolutions Ne and the accelerator opening degree accp. A known technology can be used for setting the target supercharging pressure Pimtg.

The VN 253 is controlled in the maximum supercharging mode at the beginning of the supercharging in which the supercharging pressure deviation ΔPim is large. Then, the control mode of the VN 253 is changed to the intake pressure F/B mode when the supercharging pressure deviation ΔPim reaches a certain threshold value. The maximum supercharging efficiency opening degree Avnmax is expressed by the alternate long and short dash line in the characteristic of the VN opening degree in FIG. 2.

<Problem of Cooperation Between VN Turbocharger 250 and Electrical Compressor 260>

In the engine system 10 having both of the VN turbocharger 250 and the electrical compressor 260, a supercharging performed by the electrical compressor 260 (hereinafter, it is expressed as "electrical supercharging" as occasion demands) is realized by the electrical power which is supplied from the battery, as opposed to a supercharging performed by the VN turbocharger 250 (hereinafter, it is expressed as "turbocharging" as occasion demands). In other words, the electrical supercharging is not influenced by a condition of the exhaust gas of the engine 200. Therefore, the electrical supercharging performed by the electrical compressor 260 is significantly useful at the beginning of the supercharging in which the supercharging pressure deviation ΔPim is large.

However, when the VN turbocharger 250 is controlled in accordance with the conventional control rule which is illustrated in above described FIG. 2, the following problem arises.

In the engine system 10, the intake manifold pressure Pim which is the actual supercharging pressure increases more rapidly than that in the case of FIG. 2, due to an assist of the turbocharging caused by the electrical supercharging of the electrical compressor 260. Therefore, the supercharging pressure deviation ΔPim converges more rapidly, and the control mode of the VN 253 is changed to the intake pressure F/B mode earlier than in the case of FIG. 2. Thus, most of the supercharging has to depend on the electrical compressor 260. This results in an increase of an electrical power consumption of the electrical compressor 260. The VN turbocharger 250 originally has a sufficient supercharging capacity, because the VN 253 is controlled in the intake pressure F/B mode. Namely, the earlier change of the control mode of the VN 253 into the intake pressure F/B mode causes a wasteful power consumption of the electrical compressor 260. In the embodiment, the wasteful power consumption of the electrical compressor 260 is suppressed by the operational controls (which are comprehensively expressed as "supercharging control" as occasion demands) of the electrical compressor 260 and the VN turbocharger 250 by the ECU 100.

<Details of Supercharging Control by ECU 100>

The supercharging control performed by the ECU 100 includes a deviation calculation process, an electrical compressor supply process, a VN control process, a drive requirements determination process, and a VN control change process. The processes of the control independently proceed in parallel, and are repeated with predetermined periods.

Figure 4:
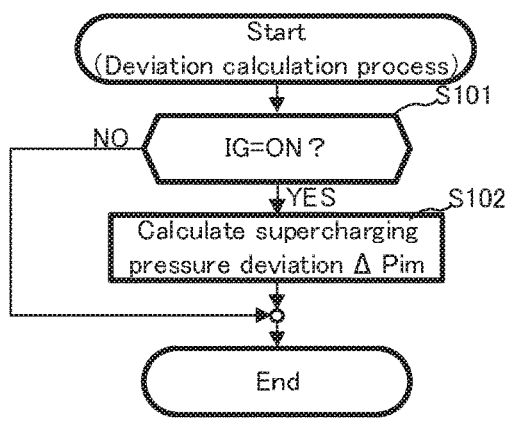
FIG. 4 is a flowchart illustrating a deviation calculation process in the first embodiment.

Firstly, with reference to FIG. 4, the deviation calculation process will be explained. FIG. 4 is a flowchart illustrating the deviation calculation process.

In FIG. 4, it is determined whether or not ignition is ON (step S101). If the ignition is OFF (the step S101: NO), the deviation calculation process ends. If the ignition is ON (the step S101: YES), the supercharging pressure deviation $\Delta$Pim is calculated (step S102). The supercharging pressure deviation $\Delta$Pim is calculated by subtracting the intake manifold pressure Pim, which is detected by the intake manifold pressures sensor 212, from the target supercharging pressure Pimtg, which is determined on the basis of the number of engine revolutions Ne and the accelerator opening degree accp. After the supercharging pressure deviation $\Delta$Pim is calculated, the calculated supercharging pressure deviation $\Delta$Pim is stored in the RAM, and the deviation calculation process ends. A plurality of the calculated supercharging pressure deviations $\Delta$Pim are sequentially stored in a chronological order.

Figure 5:
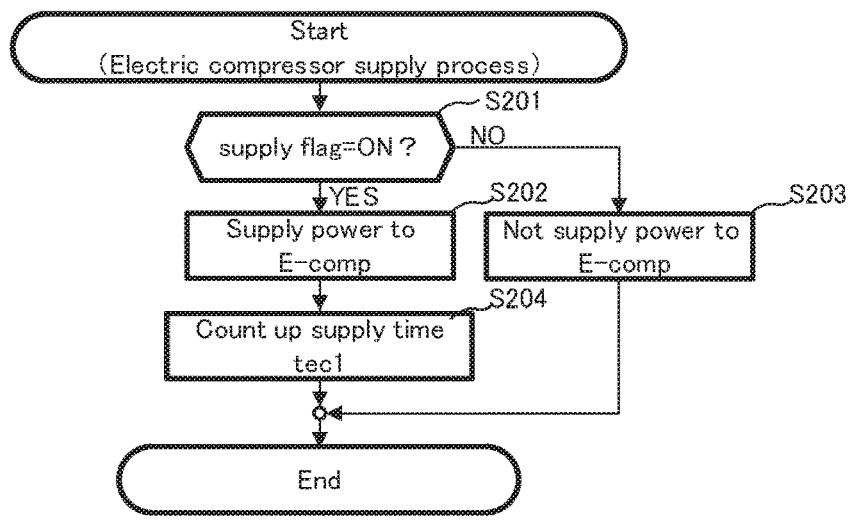
FIG. 5 is a flowchart illustrating an electrically-driven supercharger supply process in the first embodiment.

Next, with reference to FIG. 5, the electrical compressor supply process will be explained. FIG. 5 is a flowchart illustrating the electrical compressor supply process.

In FIG. 5, it is determined whether or not a supply flag is ON (step S201). The supply flag is a flag for defining a permission or a prohibition of supplying to the electrical compressor 260. If the supply flag is ON, the electrical power is permitted to be supplied, and if the supply flag is OFF, the electrical power is prohibited to be supplied. If the supply flag is OFF (the step S201: NO), the electrical compressor 260 is set in a non-supply state (step S203), and the electrical compressor supply process ends. The step S201 is one example of the operation of the above described "determining device", and the step S203 is one example of the operation of the above described "stopping device".

If the supply flag is ON (the step S201: YES), the electrical power is supplied to the electrical compressor 260 (step S202). Moreover, a supply time tec1 is counted up (step S204). If the supply time tec1 is counted up, the electrical compressor supply process ends.

In the step S202, the electrical power is supplied to the motor 262 on the basis of a supplied amount Pec (or a control current Iec) which is determined on the basis of the number of engine revolutions Ne and the accelerator opening degree accp. Any known control aspect can be used for the supply control to the electrical compressor 260.

Figure 6:
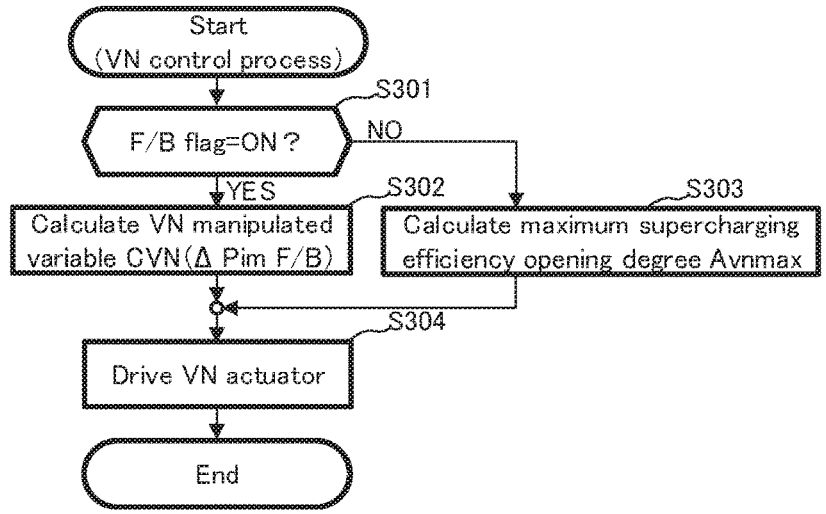
FIG. 6 is a flowchart illustrating a VN control process in the first embodiment.

Next, with reference to FIG. 6, the VN control process will be explained. FIG. 6 is a flowchart illustrating the VN control process.

In FIG. 6, it is determined whether or not an F/B flag is ON (step S301). The F/B flag is a flag for defining a permission or a prohibition of the execution of the intake pressure F/B mode described above. If the F/B flag is ON, the execution of the intake pressure F/B mode is permitted, and if the F/B flag is OFF, the execution of the intake pressure F/B mode is prohibited. If the F/B flag is OFF (the step S301: NO), the maximum supercharging efficiency opening degree Avnmax is calculated (step S303). The maximum supercharging efficiency opening degree Avnmax correlates with the intake air amount Ga as described above. Therefore, in the step S303, the maximum supercharging efficiency opening degree Avnmax is determined by selecting a relevant value from the control map on the basis of the intake air amount Ga which is detected by the airflow sensor 213. The maximum supercharging efficiency opening degree Avnmax may be determined on the basis of the number of engine revolutions Ne and a fuel injection amount Q. In any case, any VN control can be used for the determination of the maximum supercharging efficiency opening degree Avnmax.

On the other hand, if the F/B flag is ON (the step S301: YES), a VN manipulated variable CVN is calculated (step S302). The VN manipulated variable CVN is a controlled variable of the VN actuator in the intake pressure F/B mode described above. In the intake pressure F/B mode, the supercharging pressure deviation $\Delta$Pim is fed back to the VN opening degree Avn. Therefore, the VN manipulated variable CVN is obtained by adding known PID control terms including a P term (or proportional term), an I term (or integration term) and a D term (or derivative term), which are obtained from a predetermined F/B factor and the supercharging pressure deviation $\Delta$Pim stored in the RAM.

After the VN manipulated variable CVN is calculated or the maximum supercharging efficiency opening degree Avnmax is calculated, the VN actuator is driven in accordance with the calculated value (step S304), and the VN control process ends.

Figure 7:
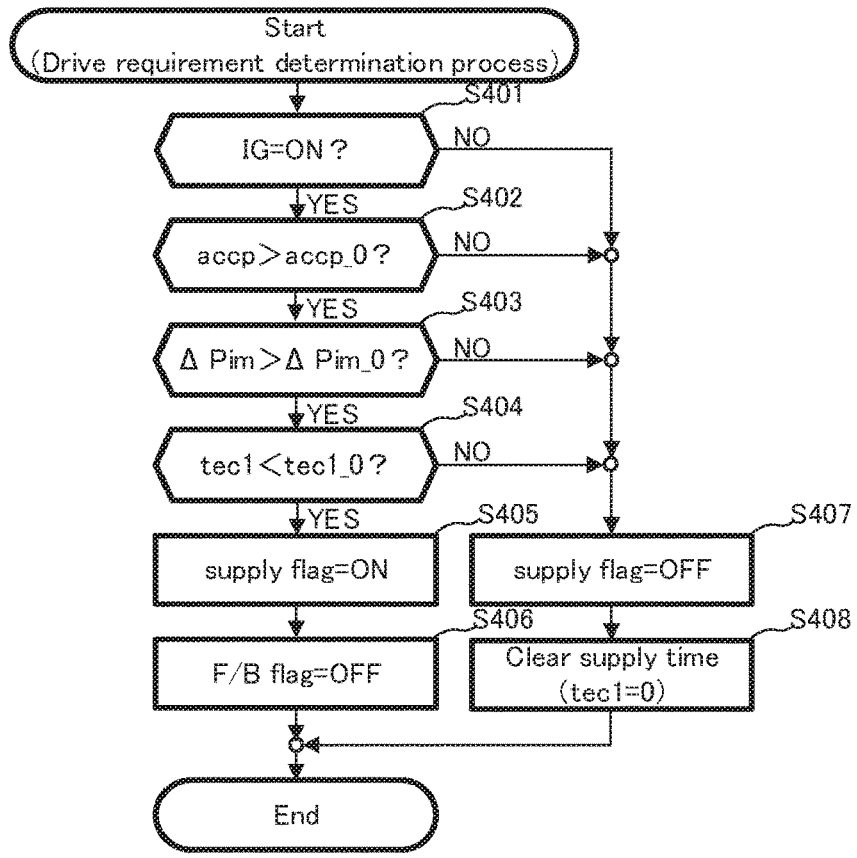
FIG. 7 is a flowchart illustrating a process of determining drive requirements for an electrically-driven supercharger in the first embodiment.

Next, with reference to FIG. 7, the drive requirements determination process will be explained. FIG. 7 is a flowchart illustrating the drive requirements determination process. The drive requirements determination process is a process of determining the presence or absence of drive requirements for the electrical compressor 260.

In FIG. 7, it is determined whether or not the ignition is ON (step S401). If the ignition is OFF (the step S401: NO), it is considered that there is no drive requirement for the electrical compressor 260, and the aforementioned supply flag is set OFF (step S407). After the supply flag is set OFF, the supply time tec1 is cleared (step S408), i.e. the supply time tec1 is initialized to zero, and the drive requirements determination process ends.

If the ignition is ON (the step S401: YES), it is determined whether or not the accelerator opening degree accp is greater than a reference value accp_0 (step S402). If the accelerator opening degree accp is less than or equal to the reference value accp_0 (the step S402: NO), it is considered that there is no drive requirement for the electrical compressor 260, and the aforementioned supply flag is set OFF (the step S407).

If the accelerator opening degree accp is greater than the reference value accp_0 (the step S402: YES), i.e. in short, if there are high acceleration requirements, it is determined whether or not the supercharging pressure deviation $\Delta$Pim is greater than a first reference value $\Delta$Pim_0 (step S403).

If the supercharging pressure deviation $\Delta$Pim decreases as the electrical compressor 260 and the VN turbocharger 250 supercharge and if the supercharging pressure deviation $\Delta$Pim becomes less than or equal to the first reference value $\Delta$Pim_0 (the step S403: NO), it is considered that there is no need to drive the electrical compressor, and the aforementioned supply flag is set OFF (the step S407).

If the supercharging pressure deviation ΔPim is greater than the first reference value ΔPim_0 (the step S403: YES), it is determined whether or not the supply time tec1 is less than a reference value tec1_0 (step S404). The reference value tec1_0 is an upper limit in control which is suitably set in order not to deteriorate a fuel efficiency. The reference value tec1_0 is corrected as occasion demands in view of a SOC (or storage amount) of the battery and an operating state of another electrical auxiliary machines. If the supply time tec1 becomes greater than or equal to the reference value tec1_0 (the step S404: NO), it is considered that there is no need to drive the electrical compressor 260 from the viewpoint of preventing the deterioration of the fuel efficiency, and the aforementioned supply flag is set OFF (the step S407).

On the other hand, if the ignition is ON, if the accelerator opening degree accp is greater than the reference value accp_0, if the supercharging pressure deviation ΔPim is greater than the first reference value ΔPim_0, and if the supply time tec1 is less than the reference value tec1_0 (the step S404: YES), then, the supply flag is set ON (step S405). After the supply flag is set ON, the F/B flag is set OFF (step S406). After the step S406 or the step S408 is performed, the drive requirements determination process ends.

Figure 8:
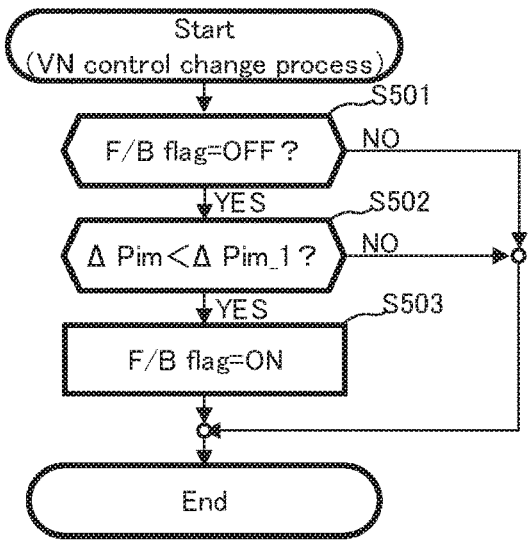
FIG. 8 is a flowchart illustrating a VN control change process in the first embodiment.

Next, with reference to FIG. 8, the VN control change process will be explained. FIG. 8 is a flowchart illustrating the VN control change process. The VN control change process is a process of changing the control mode of the VN 253, and in short, it is a process regarding the setting of the F/B flag.

In FIG. 8, it is determined whether or not the F/B flag is OFF (step S501). If the F/B flag is ON (the step S501: NO), the VN control change process ends.

If the F/B flag is OFF (the step S501: YES), it is determined whether or not the supercharging pressure deviation ΔPim is less than a second reference value ΔPim_1 (ΔPim_1≤ΔPim_0) (step S502). If the supercharging pressure deviation ΔPim is greater than or equal to the second reference value ΔPim_1 (the step S502: NO), the F/B flag remains OFF and the VN control change process ends.

If the supercharging pressure deviation ΔPim is less than the second reference value ΔPim_1 (the step S502: YES), the F/B flag is changed to ON (step S503), and the VN control change process ends. The step S502 is one example of the operation of the above described "maintaining device".

Figure 9:
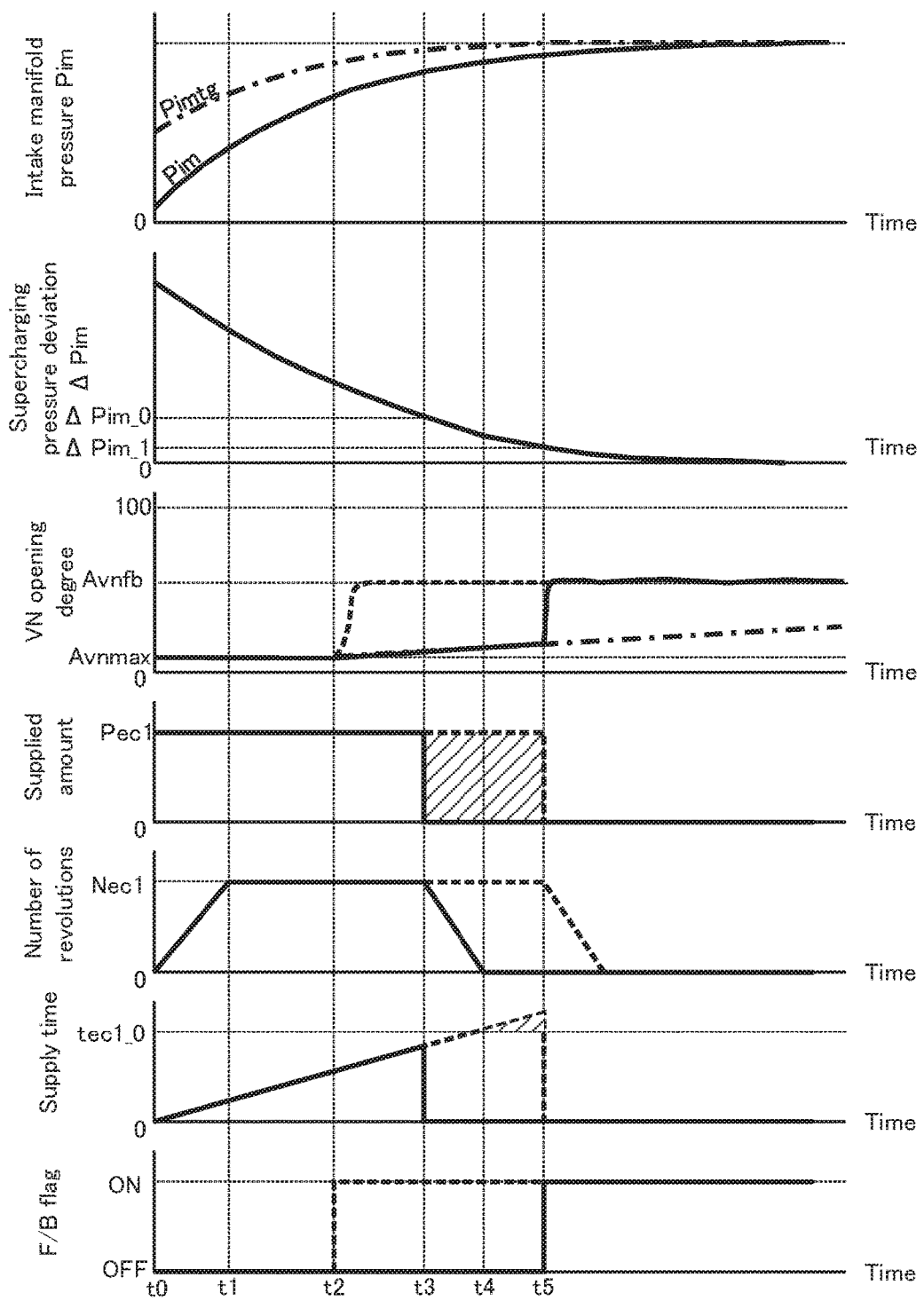
FIG. 9 is a timing chart in supercharging control in the first embodiment.

Next, with reference to FIG. 9, the effect of the supercharging process which is explained in FIG. 4 to FIG. 8 will be explained. FIG. 9 is a timing chart explaining the effect of the supercharging process. In FIG. 9, the same parts as those in FIG. 2 will carry the same reference numerals, and an explanation thereof will be omitted as occasion demands.

FIG. 9 illustrates a time transition of the intake manifold pressure Pim, a time transition of the supercharging pressure deviation ΔPim, a time transition of the VN opening degree Avn, a time transition of the supplied amount Pec to the electrical compressor 260, a number of revolutions Nec of the electrical compressor 260, the supply time tec1 of the electrical compressor 260 and the F/B flag, in the execution of the supercharging process, in this order from its top. Solid lines in the respective time transitions correspond to the supercharging control in the embodiment.

It is assumed that the accelerator pedal 11 is pressed at a time point t0 after the ignition is ON and that the accelerator opening degree accp becomes greater than the reference value accp_0. The supercharging pressure deviation ΔPim is greater than the first reference value ΔPim_0 at the time point t0 and the supply time tec1=0. Thus, the supply flag is set ON, and the electrical compressor 260 starts to operate. In other words, the supplied amount Pec is set to Pea and the number of revolutions Nec of the compressor 261 of the electrical compressor 260 starts to increase toward a target value Nec1. The number of revolutions Nec of the compressor 261 reaches the target value Nec1 at a time point t1.

Moreover, since the supply flag is set ON, the F/B flag is OFF at the time point t0 and the control mode of the VN 253 is the maximum supercharging mode. The VN opening degree Avn is therefore maintained at the maximum supercharging efficiency opening degree Avnmax. In FIG. 9, it is assumed, for convenience, that the supplied amount Pec at the time point t0 is already Pec1; however, the supplied amount Pec may increase or decrease to reach Pec1. Rising characteristics and falling characteristics of the supplied amount Pec do not influence the effect of the supercharging control in the embodiment.

After the electrical supercharging starts to be performed by the electrical compressor 260, the supercharging pressure deviation ΔPim starts to decrease due to the effect of the electrical compressor 260 whose supercharging response is good. If the supercharging pressure deviation ΔPim reaches the first reference value ΔPim_0 at a time point t3 while the supercharging pressure deviation ΔPim decreases, the supply flag is set OFF and the electrical compressor 260 stops the operation. In other words, the supplied amount Pec is set to zero, and the number of revolutions Nec of the compressor 261 starts to decrease at the time point t3 and becomes zero at a time point t4. At this time, the bypass adjusting valve 208 is fully opened, and it is prevented the pressure of the compressor 261 from being the loss.

Incidentally, here, the electrical compressor 260 stops the operation after the supercharging pressure deviation ΔPim reaches the first reference value ΔPim_0. The electrical compressor 260 stops the operation at an earlier one of the time point (the time point t4 here) at which the supply time tec1, which starts to be counted at the time point t0, reaches the reference value tec1_0 and the time point (the time point t3 here) at which the supercharging pressure deviation ΔPim reaches the first reference value supercharging pressure deviation ΔPim_0, as described above.

On the other hand, the control mode of the VN 253 of the VN turbocharger 250 is maintained in the maximum supercharging mode because the supply flag is ON in a time domain before the electrical compressor 260 stops the operation. Moreover, the maximum supercharging mode is maintained until the supercharging pressure deviation ΔPim reaches the second reference value ΔPim_1 after the electrical compressor 260 stops the operation. At a time point t5, if the supercharging pressure deviation ΔPim reaches the second reference value ΔPim_1 (or more accurately, if the supercharging pressure deviation ΔPim falls below ΔPim_1), the F/B flag is set ON. After that, the VN opening degree Avn is maintained at an F/B opening degree Avnfb which depends on the VN manipulated variable CVN described above.

For comparison, the time transition of each parameter in the case where the VN turbocharger 250 is controlled in the conventional method of FIG. 2 is illustrated in dashed line. In other words, if the electrical compressor 260 and the VN turbocharger 250 are controlled under mutually independent conditions, the control mode of the VN 253 is sometimes changed to the intake pressure F/B mode in a period during which the electrical supercharging is performed by the electrical compressor 260. FIG. 9 illustrates that the control mode is changed from the maximum supercharging mode to the intake pressure F/B mode at the time point t2.

As described above, if the maximum supercharging mode ends before the supplied mount Pec to the electrical compressor 260 decreases along with the determination of the stop of the operation of the electrical compressor 260, the electrical power is continued to be supplied to the electrical compressor 260 even though the VN turbocharger 250 has a sufficient supercharging capacity. In other words, the wasteful power consumption occurs on the electrical compressor 260. In FIG. 9, the wasteful power consumption is displayed by hatching.

In contrast, according to the supercharging control in the embodiment, the control mode of the VN 253 is definitely maintained in the maximum supercharging mode in the period during which the electrical supercharging performed by the electrical compressor 260 continues. Therefore, the wasteful power consumption of the electrical compressor 260 does not occur.

In the embodiment, the maximum supercharging mode is maintained in the electrical supercharging period, by both of a condition that the second reference value $\Delta Pim\_1$ which is associated with the ON setting of the F/B flag is less than or equal to the first reference value $\Delta Pim\_0$ which is associated with the stop of the supply to the electrical compressor 260 and a condition that the F/B flag is OFF in a period during which the supply flag is ON. However, one of the conditions may be used.

In FIG. 9, the first reference value $\Delta Pim\_0$>the second reference value $\Delta Pim\_1$; however, the second reference value $\Delta Pim\_1$ may be equal to (=) the first reference value $\Delta Pim\_0$. In this case, the supply of the electrical power to the electrical compressor 260 is stopped at a time point at which the supercharging pressure deviation $\Delta Pim$ reaches $\Delta Pim\_0$, and the intake pressure F/B mode is started at a time point at which (i.e. at substantially the same time as) the supercharging pressure deviation $\Delta Pim$ becomes less than $\Delta Pim\_0$. Even in this case, the intake pressure F/B mode does not starts before the supplied amount Pec to the electrical compressor 260 decreases.

<Second Embodiment>

Next, a supercharging control in a second embodiment will be explained. In the supercharging control in the second embodiment, the drive requirements determination process and the VN control change process are different from those in the first embodiment. It is assumed that an apparatus structure in the second embodiment is the same as that in the first embodiment.

Figure 10:
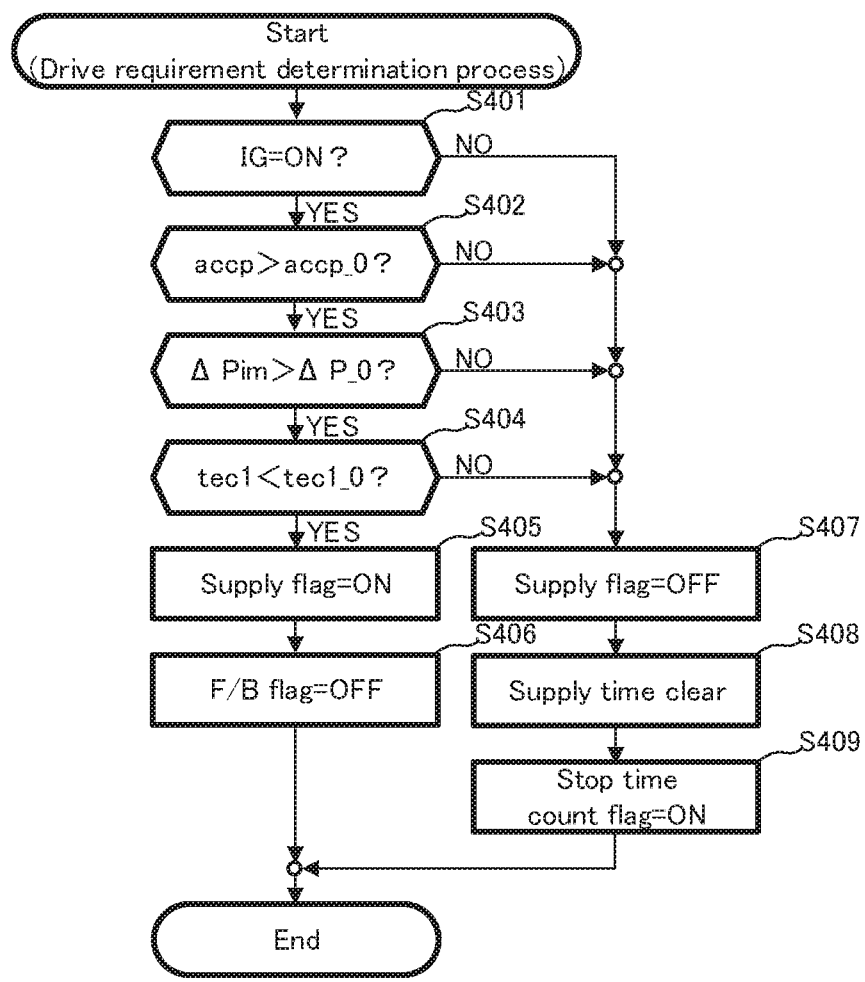
FIG. 10 is a flowchart illustrating a process of determining drive requirements for an electrically-driven supercharger in a second embodiment.

Firstly, with reference to FIG. 10, the drive requirements determination process will be explained. FIG. 10 is a flowchart illustrating the drive requirements determination process in the second embodiment. In FIG. 10, the same parts as those in FIG. 7 will carry the same reference numerals, and an explanation thereof will be omitted as occasion demands.

In FIG. 10, after the supply time tec1 is cleared in the step S408, a stop time count flag is set ON (step S409). The stop time count flag is a flag for defining a permission or a prohibition of count of a stop time tec2 which is an elapsed time from a time point at which the supplied amount Pec to the electrical compressor 260 becomes zero. If the stop time count flag is ON, the count of the stop time tec2 is permitted, and if the stop time count flag is OFF, the count of the stop time tec2 is not permitted. If the stop time count flag is set ON, the drive requirements determination process ends.

Figure 11:
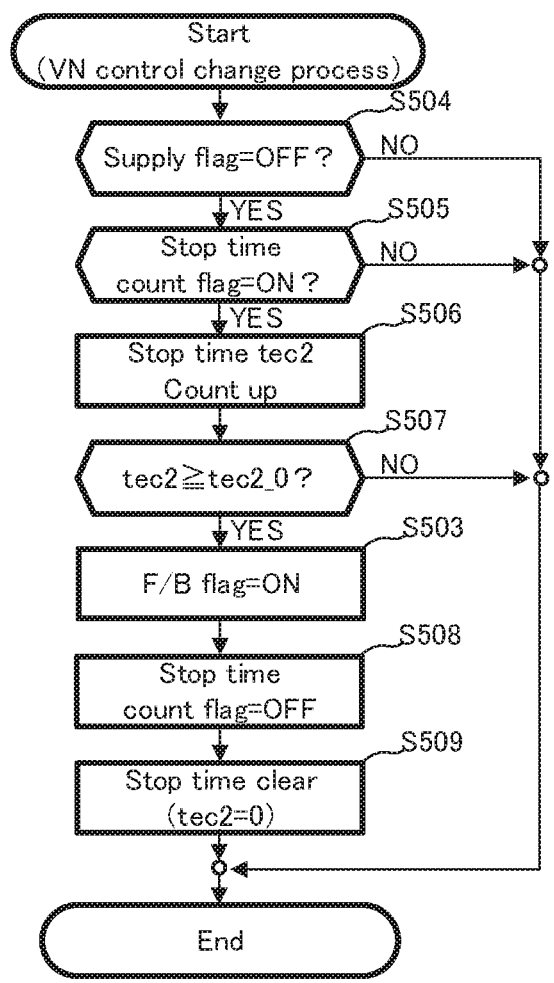
FIG. 11 is a flowchart illustrating a VN control change process in the second embodiment.

Next, with reference to FIG. 11, the VN control change process will be explained. FIG. 11 is a flowchart illustrating the VN control change process in the second embodiment. In FIG. 11, the same parts as those in FIG. 8 will carry the same reference numerals, and an explanation thereof will be omitted as occasion demands.

In FIG. 11, it is firstly determined whether or not the supply flag is OFF (step S504). If the supply flag is ON (the step S504: NO), the VN control change process ends. If the supply flag is OFF (the step S504: YES), it is determined whether or not the stop time count flag is ON (step S505). If the stop time count flag is OFF (the step S505: NO), the VN control change process ends. If the stop time count flag is ON (the step S505: YES), the stop time tec2 is counted up (step S506). If the stop time tec2 is counted up, it is determined whether or not the stop time tec2 is greater than or equal to a reference value tec2_0 (step S507). If the stop time tec2 is less than the reference value tec2_0 (the step S507: NO), the VN control change process ends. If the processes in the steps S504, S505 and S507 branch into the "NO" sides, the control mode of the VN 253 is maintained in the maximum supercharging mode.

If the stop time tec2 is greater than or equal to the reference value tec2_0 (the step S507: YES), the F/B flag is set ON (the step S503), the stop time count flag is set OFF (step S508), and the stop time tec2 is cleared. In other words, the stop time tec2 is initialized to zero. If the stop time tec2 is initialized, the VN control change process ends.

Figure 12:
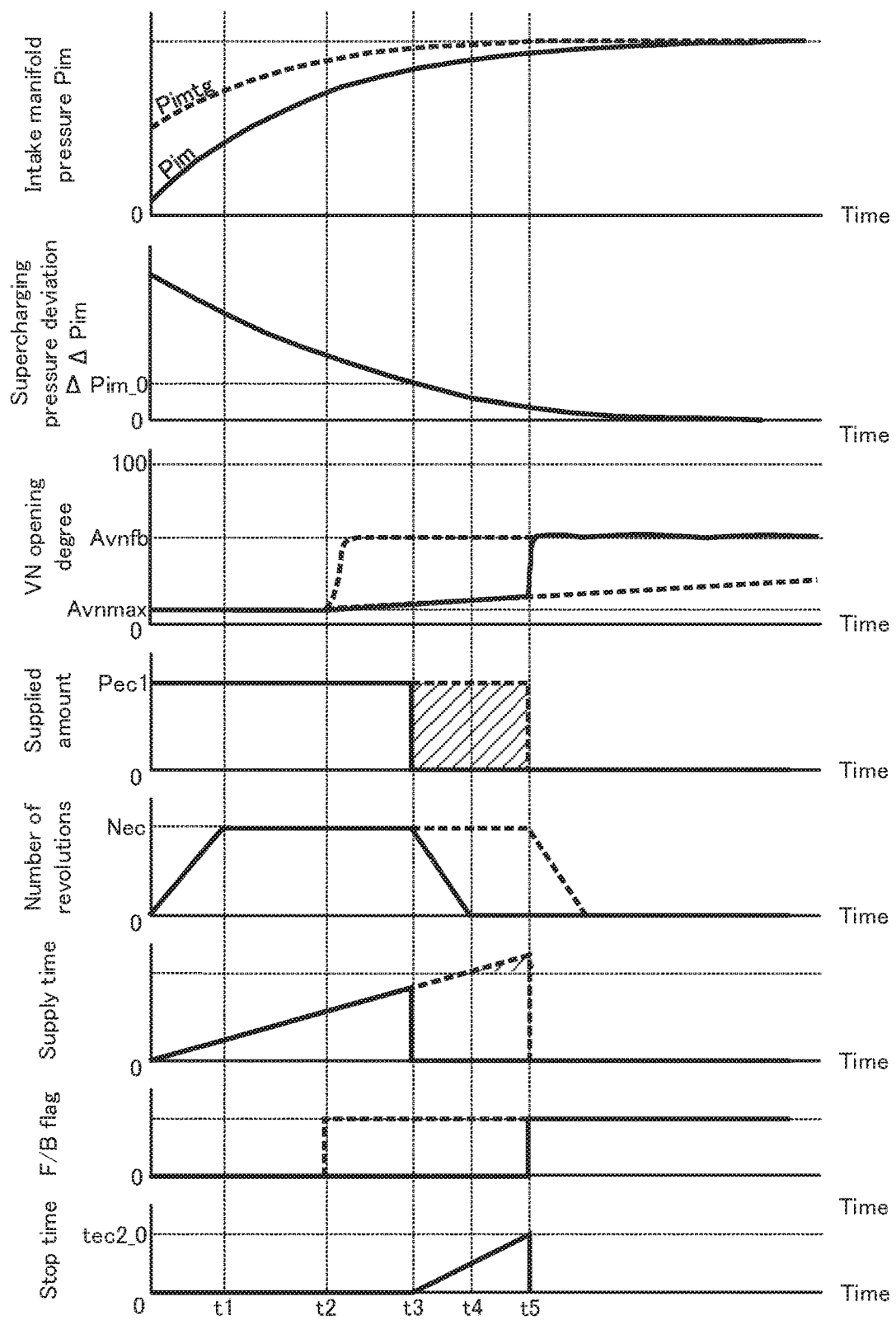
FIG. 12 is a timing chart in supercharging control in the second embodiment.

Now, with reference to FIG. 12, the effect of the supercharging control in the second embodiment will be explained. FIG. 12 is a timing chart explaining the effect of the supercharging control in the second embodiment. In FIG. 12, the same parts as those in FIG. 9 will carry the same reference numerals, and an explanation thereof will be omitted as occasion demands.

FIG. 12 illustrates a time transition of the stop time tec2 at the bottom. The count of the stop time tec2 is started at the time point t3 at which the supply flag is set OFF and at which the supply of the electrical power to the electrical compressor 260 is stopped, and the stop time tec2 is reset at the time point t5 at which the stop time tec2 reaches the reference value tec2_0. If the stop time tec2 reaches the reference value tec2_0, the F/B flag is set ON, and the control mode of the VN 253 is changed to the intake pressure F/B mode. In other words, according to the supercharging control in the embodiment, it is possible to prevent the change of the control mode of the BVN 253 before the supplied amount Pec to the electrical compressor 260 decreases, without setting the second reference value $\Delta Pim\_1$ of the supercharging pressure deviation $\Delta Pim$.

Here, the reference value tec2_0 is set to be greater than zero; however, the reference value tec2_0 may be zero. Even in this case, the control mode of the VN 263 is not changed to the intake pressure F/B mode before the supplied amount Pec to the electrical compressor 260 decreases.

Moreover, in the embodiment, the elapsed time from the stop of the supply of the electrical power to the electrical compressor 260 is used as a trigger; however, an integrated value of the intake air amount Ga (i.e. an integrated intake air amount) after the time point of the stop of the supply of the electrical power to the electrical compressor 260 may be used.

<Third Embodiment>

Next, a supercharging control in a third embodiment will be explained. In the supercharging control in the third embodiment, the drive requirements determination process and the VN control process are different from those in the first embodiment, and a correction deviation calculation process is used instead of VN control change process. It is assumed that an apparatus structure in the third embodiment is the same as that in the first embodiment.

Figure 13:
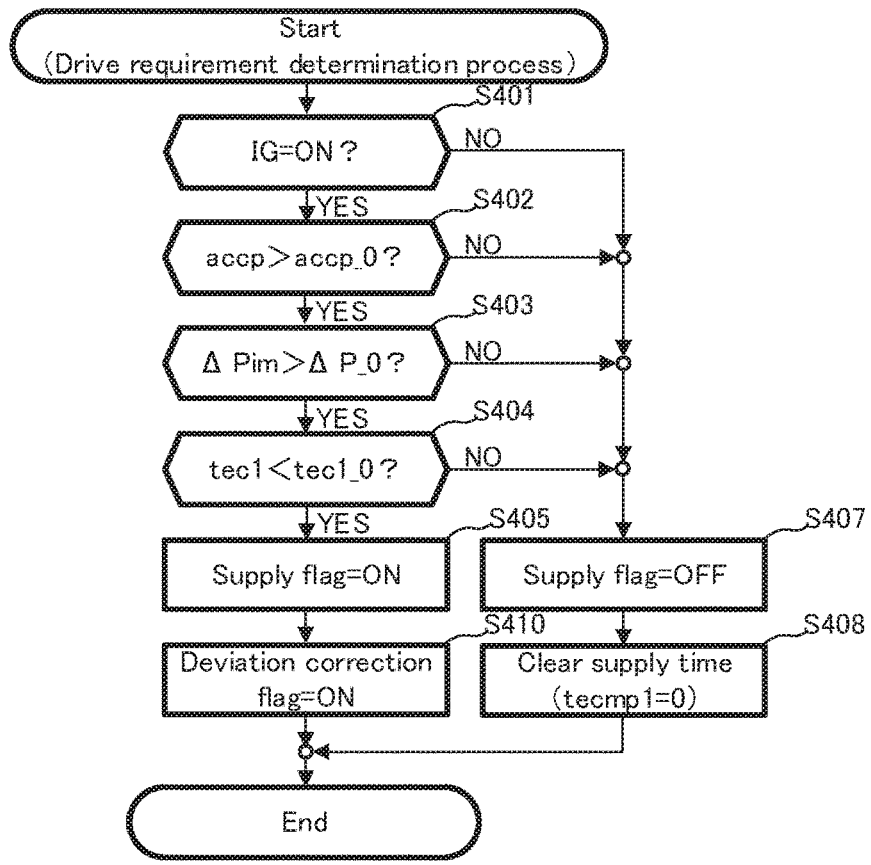
FIG. 13 is a flowchart illustrating a process of determining drive requirements for an electrically-driven supercharger in a third embodiment.

Firstly, with reference to FIG. 13, the drive requirements determination process will be explained. FIG. 13 is a flowchart illustrating the drive requirements determination process in the third embodiment. In FIG. 13, the same parts as those in FIG. 7 will carry the same reference numerals, and an explanation thereof will be omitted as occasion demands.

In FIG. 13, if the supply flag is set ON in the step S405, a deviation correction flag is set ON (step S410). The deviation correction flag is a flag which is related to the correction of the supercharging pressure deviation $\Delta Pim$ used for determining the change of the control mode of the VN 253. If the deviation correction flag is set ON, the supercharging pressure deviation $\Delta Pim$ is corrected, and if the deviation correction flag is set OFF, the supercharging pressure deviation $\Delta Pim$ is not corrected. If the deviation correction flag is set ON, the drive requirements determination process ends.

Figure 14:
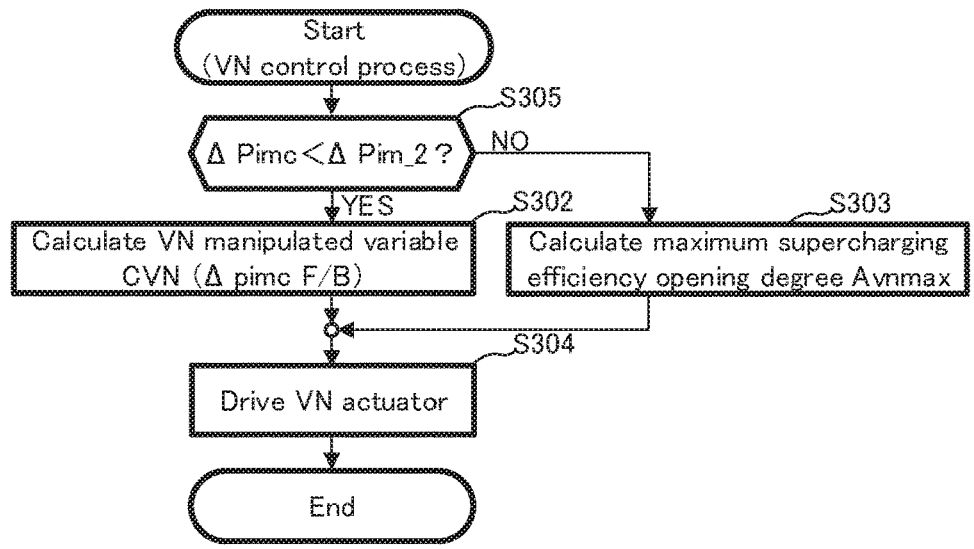
FIG. 14 is a flowchart illustrating a VN control change process in the third embodiment.

Next, with reference to FIG. 14, the VN control process will be explained. FIG. 14 is a flowchart illustrating the VN control process in the third embodiment. In FIG. 14, the same parts as those in FIG. 6 will carry the same reference numerals, and an explanation thereof will be omitted as occasion demands.

In FIG. 14, it is firstly determined whether or not a corrected supercharging pressure deviation $\Delta Pimc$ is less than a reference value $\Delta Pim\_2$ (step S305). The corrected supercharging pressure deviation $\Delta Pimc$ will be described later. If the corrected supercharging pressure deviation $\Delta Pimc$ is greater than or equal to the reference value $\Delta Pim\_2$ (the step S305: NO), the control mode of the VN 253 becomes the maximum supercharging mode, and the maximum supercharging efficiency opening degree Avnmax is calculated (the step S303). If the corrected supercharging pressure deviation $\Delta Pimc$ is less than the reference value $\Delta Pim\_2$ (the step S305: YES), the control mode of the VN 253 becomes the intake pressure F/B mode, and the VN manipulated variable CVN is calculated (step S302). At this time, the corrected supercharging pressure deviation $\Delta Pimc$ is used as a supercharging pressure deviation used for the PID control of the intake pressure F/B mode.

Figure 15:
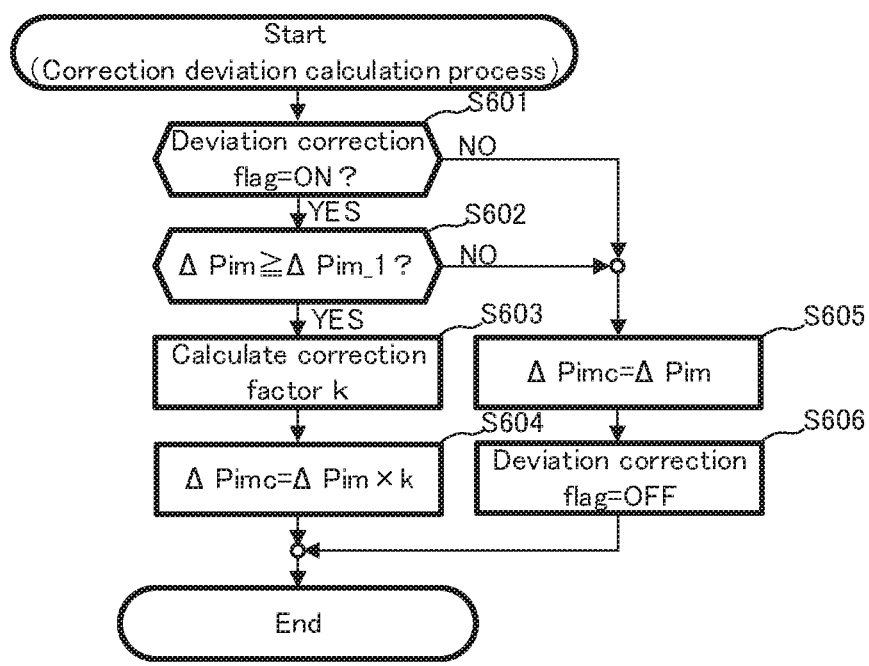
FIG. 15 is a flowchart illustrating a correction deviation calculation process in the third embodiment.

Next, with reference to FIG. 15, the corrected deviation calculation process will be explained. FIG. 15 is a flowchart illustrating the corrected deviation calculation process.

In FIG. 15, it is determined whether or not the deviation correction flag is set ON (step S601). If the deviation correction flag is set OFF (the step S601: NO), the supercharging pressure deviation $\Delta Pim$ is not corrected, the corrected supercharging pressure deviation $\Delta Pimc$ is set to be a value equal to the supercharging pressure deviation $\Delta Pim$ (step S605). After that, the deviation correction flag is set OFF (step S606), the correction deviation calculation process ends.

In the step S601, if the deviation correction flag is set ON (the step S601: YES), it is determined whether or not the supercharging pressure deviation $\Delta Pim$ is greater than or equal to the second reference value $\Delta Pim\_1$ (step S602). If the supercharging pressure deviation $\Delta Pim$ is less than the second reference value $\Delta Pim\_1$ (the step S602: NO), the process moves to a step S605.

On the other hand, if the supercharging pressure deviation $\Delta Pim$ is greater than or equal to the second reference value $\Delta Pim\_1$ (the step S602: YES), a correction factor k (k>1) is calculated (step S603). After the correction factor k is calculated, the supercharging pressure deviation $\Delta Pim$ is multiplied by the correction factor k to calculate the corrected supercharging pressure deviation $\Delta Pimc$ (step S604). After the corrected supercharging pressure deviation $\Delta Pimc$ is calculated, the correction deviation calculation process ends.

Figure 16:
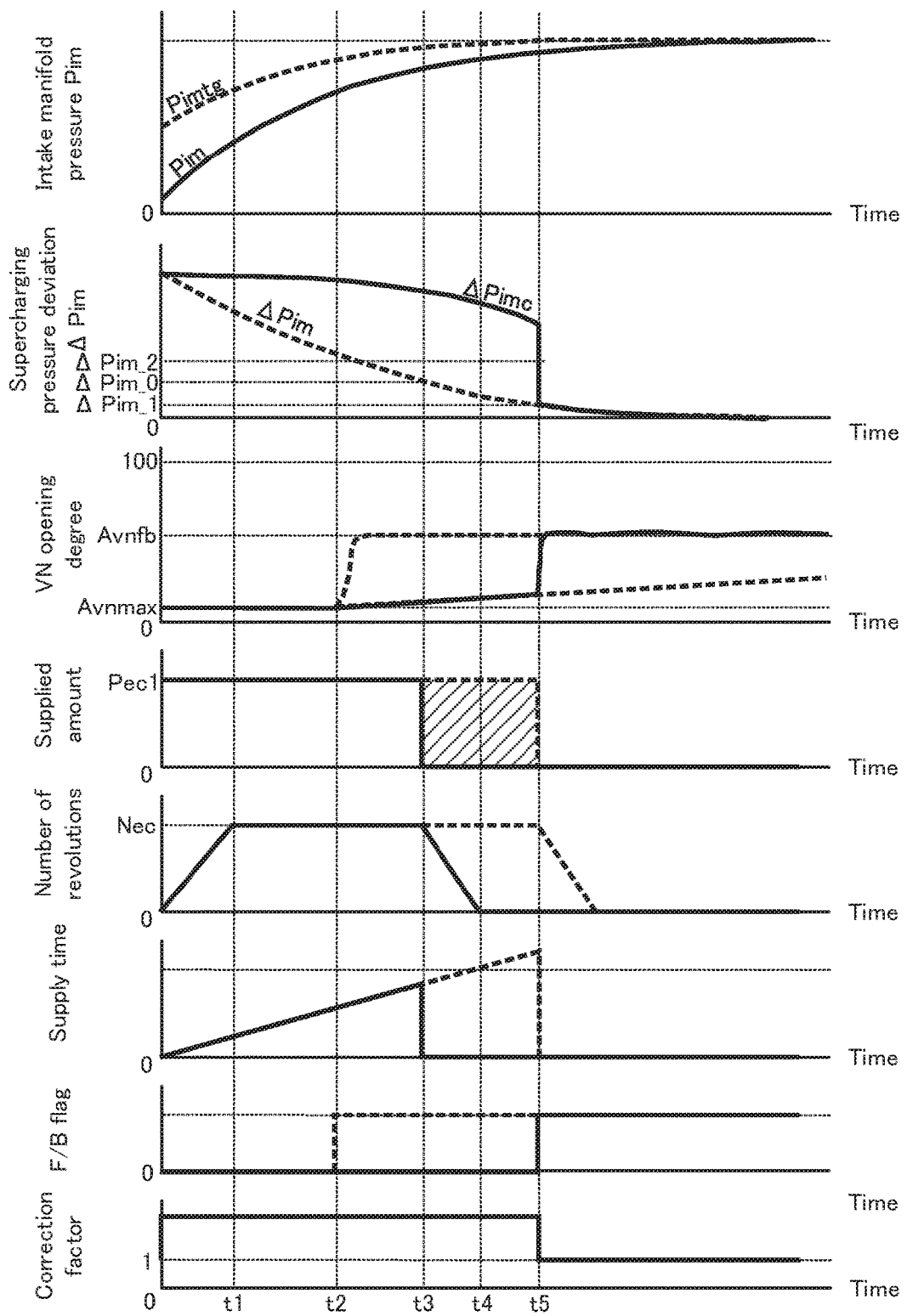
FIG. 16 is a timing chart in supercharging control in the third embodiment.

Now, with reference to FIG. 16, the effect of the supercharging control in the third embodiment will be explained. FIG. 16 is a timing chart explaining the effect of the supercharging control in the third embodiment. In FIG. 16, the same parts as those in FIG. 9 will carry the same reference numerals, and an explanation thereof will be omitted as occasion demands.

FIG. 16 illustrates a time transition of the correction factor k at the bottom. The correction factor k is set to be greater than 1 at the time point t0 at which the supply flag is set ON. As a result, the corrected supercharging pressure deviation $\Delta Pimc$ which is used to determine the control mode of the VN 253 becomes a value which is obtained by smoothing the actual supercharging pressure deviation $\Delta Pim$ until the supercharging pressure deviation $\Delta Pim$, which is the actual supercharging pressure deviation, becomes less than the second reference value $\Delta Pim\_1$ (until substantially the time point t5). Therefore, if the reference value $\Delta Pim\_2$ is appropriately set, it is possible to maintain the control mode of the VN 253 in the maximum supercharging mode in a period until the supercharging pressure deviation $\Delta Pim$ reaches the second reference value $\Delta Pim\_1$. In other words, as with the first and second embodiments, it is possible to prevent that the supercharging efficiency of the VN turbocharger 250 decreases before the stop of the supply of the electrical power to the electrical compressor 260, and to suppress the wasteful power consumption of the electrical compressor 260.

Moreover, according to the supercharging control in the embodiment, it is possible to suppress the wasteful power consumption of the electrical compressor 260, without specifically making the VN turbocharger 250 and the electrical compressor 260 cooperate with each other, by correcting the supercharging pressure deviation $\Delta Pim$ which is a control factor of the VN 253. It is therefore possible to efficiently use the control of the conventional VN turbocharger 250.

Here, the supercharging pressure deviation $\Delta Pim$ is corrected by the correction factor k; however, the intake manifold pressure Pim, which defines the supercharging pressure deviation $\Delta Pim$, may be corrected, and the correction supercharging pressure deviation may be set from a corrected intake manifold pressure Pimc.

In the first to third embodiments, the engine 200 is provided with the VN 253 which is one example of the above described "adjusting mechanism". The above described "adjusting mechanism" is, however, not necessarily limited to the variable nozzle such as the VN 253. For example, a waste gate valve (WGV) is also preferable as one example of the "adjusting mechanism" of the present invention. The WGV is an opening/closing valve placed in an exhaust bypass passage of the exhaust tube which allows a coupling of an upstream side and a downstream side of a turbine housing. If the WGV is opened, a relatively large of exhaust gas is emitted without being supplied to a turbocharger. Moreover, if the WGV is closed, a relatively large amount of exhaust gas is supplied to the turbocharger. Therefore, the former is effective for preventing the overshoot of the supercharging pressure, and the latter is effective for an increase of the supercharging efficiency. In other words, the former handles the case where the VN 253 of the VN turbocharger 250 is driven in the intake pressure F/B mode, and the latter handles the case where the VN 253 of the VN turbocharger 250 is driven in the maximum supercharging mode. It is therefore possible to use the supercharging controls in the aforementioned various embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention. An electrical power converter, which involve such changes, are also intended to be within the technical scope of the present invention.

This application is based upon and claims the benefit of priority of the prior Japanese Patent Application No. 2014-117896, filed on Jun. 6, 2014, the entire contents of which are incorporated herein by reference. In addition, the entire contents of the above described Patent Literature(s) and/or the above described non Patent Literature(s) is incorporated herein by reference.

DESCRIPTION OF REFERENCE NUMERALS 10 engine system
100 ECU
200 engine
250 VN turbocharger (exhaust-driven supercharger)
253 VN (variable nozzle)
260 electrical compressor (electrically-driven supercharger)

The invention claimed is:

1. A control apparatus for an engine, the control apparatus being configured to control the engine, the engine comprising:
   an exhaust-driven supercharger having an adjusting mechanism at an exhaust passage, the adjusting mechanism being configured to change a supercharging efficiency according to an opening degree of the adjusting mechanism, control modes of the adjusting mechanism including a first control mode and a second control mode, the first control mode allowing the opening degree to be maintained at a maximum supercharging efficiency opening degree at which the exhaust-driven supercharger has a maximum supercharging efficiency independently of a deviation between a target supercharging pressure and an actual supercharging pressure, the second control mode allowing the deviation to be fed back to the opening degree; and
   an electrically-driven supercharger which is driven by an electrical power supplied from an electrical power supply,
   the control apparatus comprising a controller,
   the controller being programmed to:
      determine engine operating conditions;
      determine whether or not a supplied amount of the electrical power to the electrically-driven supercharger decreases due to a stop of the supply of the electrical power to the electrically-driven supercharger; and
      when the control mode of the adjusting mechanism is in the first control mode, maintain the control mode in the first control mode before it is determined that the supped amount decreases.

2. The control apparatus for the engine according to claim 1, wherein the controller is further programmed to stop the supply of the electrical power to the electrically-driven supercharger when the deviation reaches a first reference value or a time during which the electrical power is supplied to the electrically-driven supercharger reaches a predetermined time during a period during which the actual supercharging pressure increases.

3. The control apparatus for the engine according to claim 1, wherein the adjusting mechanism is configured to restrict a pathway for a flow of exhaust gas to the exhaust-driven supercharger when the opening degree of the adjusting mechanism is decreased, as compared to when the opening degree of the adjusting mechanism is increased.

4. A control apparatus for an engine, the control apparatus being configured to control the engine, the engine comprising:
   an exhaust-driven supercharger having an adjusting mechanism at an exhaust passage, the adjusting mechanism being configured to change a supercharging efficiency according to an opening degree; and
   an electrically-driven supercharger which is driven by an electrical power supplied from an electrical power supply,
   control modes of the adjusting mechanism including a first control mode and a second control mode, the first control mode allowing the opening degree to be maintained at a maximum supercharging efficiency opening degree at which the exhaust-driven supercharger has a maximum supercharging efficiency independently of a deviation between a target supercharging pressure and an actual supercharging pressure, the second control mode allowing the deviation to be fed back to the opening degree,
   the control apparatus comprising a controller,
   the controller being programmed to:
      determine engine operating conditions;
      stop the supply of the electrical power to the electrically-driven supercharger when the deviation reaches a first reference value during a period during which the actual supercharging pressure increases and
      when the control mode of the adjusting mechanism is in the first control mode, maintain the control mode in the first control mode when the deviation is greater than or equal to a second reference value,
   the first reference value being equal to or greater than the second reference value.

* * * * *